(12) United States Patent
Laimboeck

(10) Patent No.: US 6,941,918 B2
(45) Date of Patent: Sep. 13, 2005

(54) INTERNAL COMBUSTION ENGINE WITH AT LEAST ONE CYLINDER

(75) Inventor: Franz Laimboeck, Thal (AT)

(73) Assignee: AVL List GmbH, Graz (AT)

( * ) Notice: Subject to any disclaimer, the term of this patent is extended or adjusted under 35 U.S.C. 154(b) by 203 days.

(21) Appl. No.: 10/465,813

(22) Filed: Jun. 20, 2003

(65) Prior Publication Data
US 2004/0040533 A1 Mar. 4, 2004

(30) Foreign Application Priority Data

Jun. 27, 2002 (AT) ...................................... GM414/2002

(51) Int. Cl.[7] ................................................. F02F 7/00
(52) U.S. Cl. ............................... 123/195 R; 74/606 R
(58) Field of Search ........................ 123/195 R, 195 A, 123/195 AC; 74/606 R

(56) References Cited

U.S. PATENT DOCUMENTS

| 4,223,567 A | 9/1980 | Onda |
| 4,666,015 A | 5/1987 | Matsuda et al. |
| 4,938,098 A | 7/1990 | Sasoki et al. |
| 5,186,078 A | 2/1993 | Kameda et al. |

FOREIGN PATENT DOCUMENTS

EP 640755 3/1995

*Primary Examiner*—Noah P. Kamen
(74) *Attorney, Agent, or Firm*—Dykema Gossett PLLC

(57) ABSTRACT

The invention relates to an internal combustion engine (1) with at least one cylinder (2) with a reciprocating piston (4) coupled to a connecting rod (5) for rotating a crankshaft (6), with an engageable gear (8) that is comprised of a first gear shaft (12) that is driven by the crankshaft (6) through a belt-type stepless transmission (7) and of a second gear shaft (15) that is coupled to an intermediate shaft (18) for rotating a drive shaft (9), and with a balancer shaft (20) driven by the crankshaft (6), said crankshaft (6), first gear shaft (12), second gear shaft (15), intermediate shaft (18) and balancer shaft (20) being disposed in one common, multi-piece housing (24). For ease of manufacturing, machining and assembling, there is provided that at least five shafts selected from the group consisting of the crankshaft (6), the first gear shaft (12), the second gear shaft (15), the intermediate shaft (18) and the balancer shaft (20) be disposed in a first parting plane (21) of a first and a second housing piece (22, 23) of the housing (24).

9 Claims, 3 Drawing Sheets

INTERNAL COMBUSTION ENGINE WITH AT LEAST ONE CYLINDER

BACKGROUND OF THE INVENTION

The invention relates to an internal combustion engine with at least one cylinder with a reciprocating piston coupled to a connecting rod for rotating a crankshaft, with an engageable gear that is comprised of a first gear shaft that is driven by the crankshaft through a belt-type stepless transmission and of a second gear shaft that is coupled to an intermediate shaft for rotating a drive shaft, and with a balancer shaft driven by the crankshaft, said crankshaft, first gear shaft; second gear shaft, intermediate shaft and balancer shaft being disposed in one common, multi-piece housing.

Internal combustion engines of the type mentioned herein above serve to drive what are termed ATVs (All-Terrain-Vehicles), motorcycles and motor scooters. Engine and gearing are housed together in one multi-piece housing. Usually, the housing is divided in a plane normal to the axis of the crankshaft. This however has the disadvantage that machining and assembly of the housing pieces is quite complicated as a plurality of shafts are to be inserted simultaneously into corresponding shaft receiving bores provided in the housing pieces.

DESCRIPTION OF PRIOR ART

EP 0 640 755 A1 discloses an internal combustion engine in which the crankshaft, the balancer shaft, the intermediate shaft and the output shaft are disposed in a parting plane of the crankcase.

An internal combustion engine is known from U.S. Pat. No. 4,938,098 in which the crankshaft, the intermediate shaft and a gear shaft are disposed in a parting plane of the crankcase.

U.S. Pat. No. 4,223,567 shows an internal combustion engine in which four shafts, namely the crankshaft, the input shaft, the intermediate shaft and the output shaft, are also disposed in a parting plane of the crankcase.

Further, U.S. Pat. Nos. 4,666,015 or 5,186,078 also teach to dispose four shafts in a parting plane of the crankcase.

SUMMARY OF THE INVENTION

It is the object of the present invention to avoid the afore mentioned drawbacks and to further simplify the manufacturing of the parts of an internal combustion engine of the type mentioned herein above as well as the assembly process.

This is achieved in accordance with the invention by disposing at least five shafts selected from the group consisting of the crankshaft, the first gear shaft, the second gear shaft, the intermediate shaft and the balancer shaft in a first parting plane of a first and a second housing piece of the housing. The shafts are placed in the first or second housing piece in such a manner that the rotational axes of the shafts lie in the first parting plane. The other housing piece is simply placed on top thereof. There is further provided that a third housing piece is adjoined with the second housing piece, a second parting plane extending between the second and the third housing piece, preferably in a parallel orientation with the first parting plane, the rotational axis of the drive shaft most preferably lying in the second parting plane.

A particularly simple construction is achieved in covering the front ends of the crankshaft and of the first gear shaft at least with a fourth and fifth housing piece, said fourth and fifth housing piece forming with the first and second housing piece third and fourth parting planes that are preferably oriented normal to the first parting plane. Accordingly, the first and second housing pieces are open on their front ends. The fourth and fifth housing pieces are disposed on different front ends of the shafts.

In a further implementation of the invention there may be provided that the cylinder is disposed in the same housing as the shafts.

In a particularly preferred alternative implementation of the invention there is provided that a differential gear is disposed in the housing in the region of the drive shaft. Within the scope of the invention there is further provided that a transmission shaft takes departure from the differential gear at right angles to the drive shaft, said transmission shaft being preferably disposed parallel to the first parting plane, most preferably in the second parting plane.

It is particularly advantageous if the gear space is hydraulically separated from the crank space. In providing complete hydraulic separation, separate lubricants which are suited for the specific functions of the internal combustion engine and the gearing may be used.

BRIEF DESCRIPTION OF THE DRAWINGS

The invention will be understood better upon reading the description accompanying the drawing wherein.

DETAILED DESCRIPTION OF THE PREFERRED EMBODIMENTS

Figure 1:
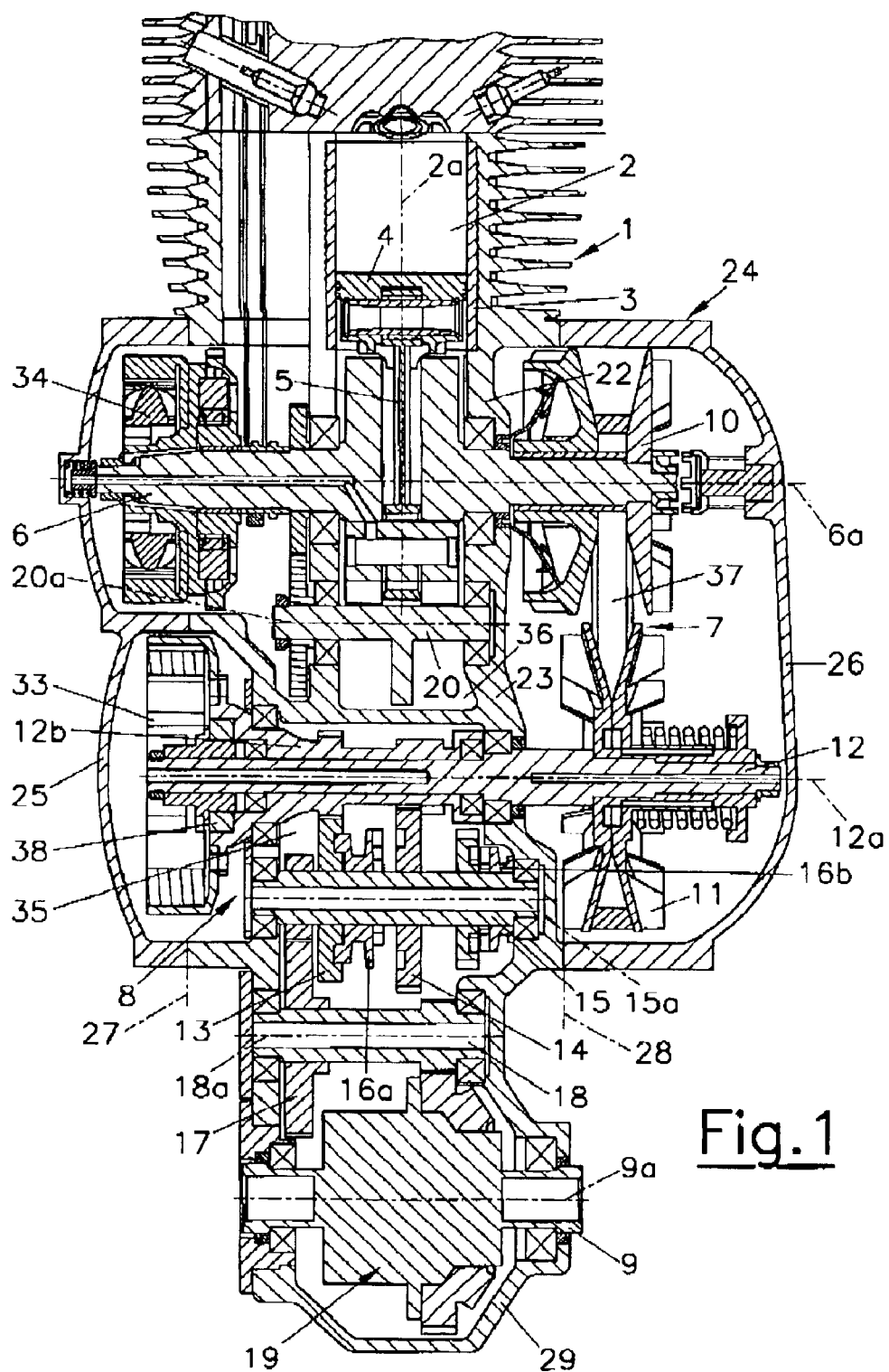
FIG. 1 is a longitudinal section of the internal combustion engine of the invention in an unfolded view taken along line I—I in FIG. 2.
Figure 2:
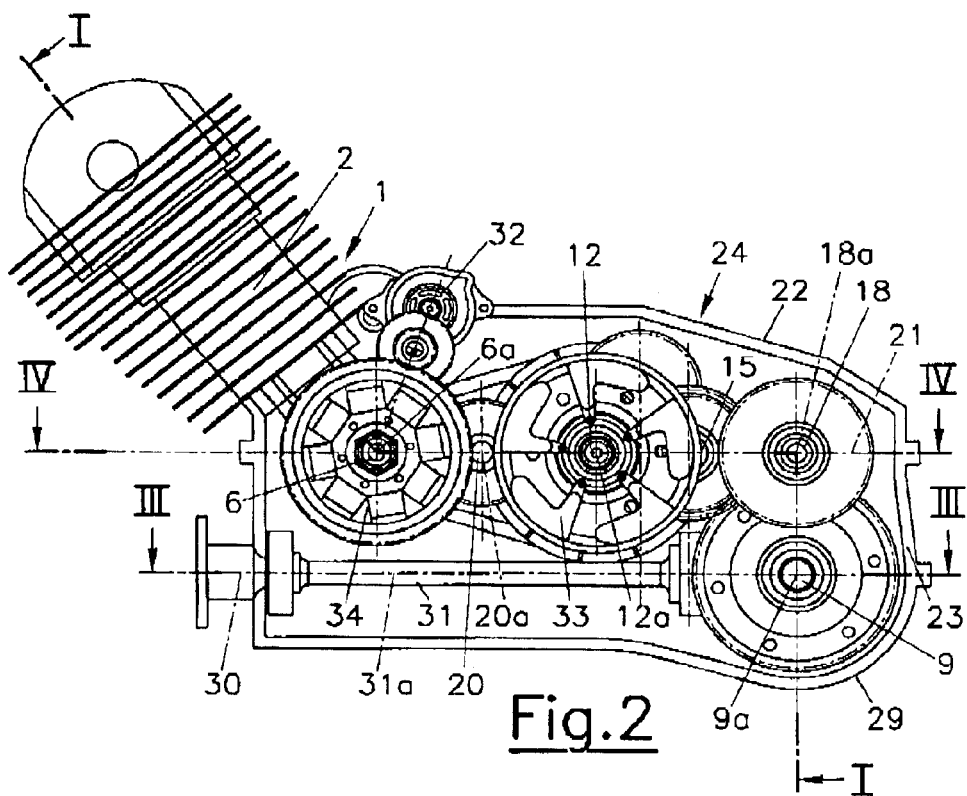
FIG. 2 is a side view of the internal combustion engine with the fourth housing piece being removed.
Figure 3:
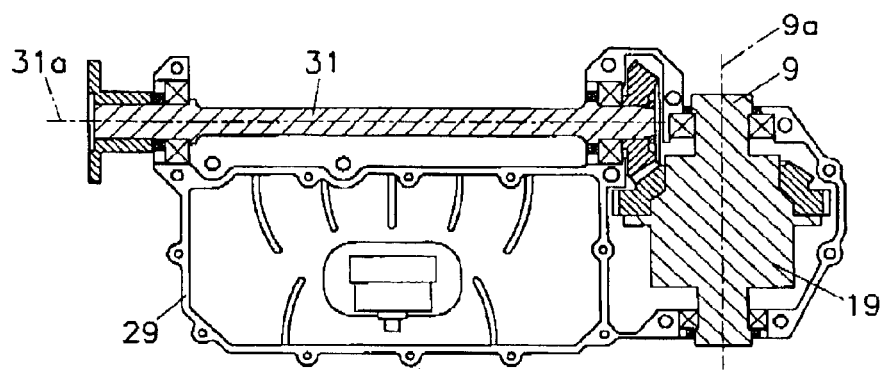
FIG. 3 is a sectional view of the internal combustion engine taken along line III—III in FIG. 2
Figure 4:
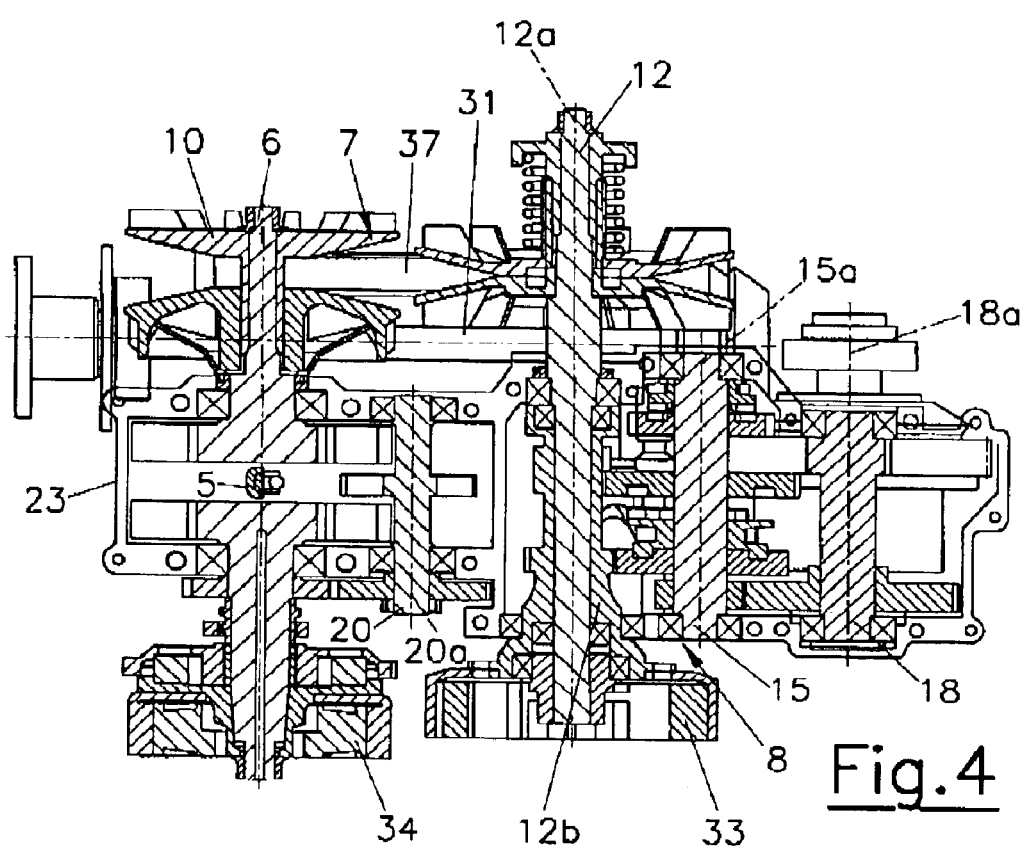
FIG. 4 is a sectional view of the internal combustion engine taken along line IV—IV in FIG. 2.

The internal combustion engine 1 is comprised of one or several cylinders 2 accommodating a piston 4 reciprocating within a cylinder liner 3. The piston 4 is coupled to a connecting rod 5 for rotating a crankshaft 6. The crankshaft 6 is connected to a drive shaft 9 of the vehicle through a belt transmission 7 with continuously variable transmission and an engageable gear 8.

The belt-type dry running stepless transmission 7 is comprised of a first belt pulley 10 coupled to the crankshaft 6 and of a second belt pulley 11 coupled to a first gear shaft 12, a belt 37 coupling the two variable diameter belt pulleys 10, 11. The first gear shaft 12 actuates a second gear shaft 15 through pairs of spur gears 13, 14. Switching between slow and fast speed is performed by displacing a shift sleeve 16a by means of a shift fork that has not been illustrated herein. A second shift sleeve 16b serves to engage a reverse gear.

The second gear shaft 15 is coupled through an additional pair of spur gears 17 to an intermediate shaft 18 that is coupled to a schematically outlined differential gear 19 for rotating drive shafts 9. In FIG. 1, the rotational axis 9a of the drive shaft 9 and the cylinder's axis 2a are rotated in the plane of the drawing. The rotational axes 6a of the crankshaft 6, 12a of the first gear shaft 12, 15a of the second gear shaft 15 and 18a of the intermediate shaft 18 as well as the rotational axis 20a of the balancer shaft 20, which is driven by the crankshaft 6, are located in a parting plane 21 of the first and second housing pieces 22, 23 of the housing 24 accommodating the shafts 6, 12, 15, 18 and 20.

Toward the bottom, the housing 24 is closed by a third housing piece 29 adjoined with the second housing piece 23. The second parting plane 30 between the second housing piece 23 and the third housing piece 29 is oriented parallel to the first parting plane 21 and passes through the rotational axis 9a of the drive shaft 9. A transmission shaft 31 for driving front wheels (not shown), the rotational axis 31a of which is disposed in the second parting plane 30, extends from the differential gear 19 at right angles to the drive shaft 9 for the rear wheels.

At their front ends, the shafts 6, 12, 20, 15 are closed by lid-like fourth and fifth housing pieces 25, 26. The third and fourth parting planes between the first and second housing piece 22, 23 on the one side and the fourth housing piece 25 and the fifth housing piece 26 are disposed normal to the first and second parting planes 21, 30 and are labelled with the reference numerals 27 and 28.

In the exemplary embodiment, the housing 24 performs the function of a cylinder housing, a crankcase and a gearbox case. The cylinder 2 could also be housed in a cylinder housing of its own, though. Cylinder housing and cylinder head may thereby be made from one piece.

The reference numeral 32 refers to an electric starter that is actuated by the crankshaft 6 through the generator 34. On the first gear shaft 12A there is disposed a centrifugal clutch 33 that prevents, below a predetermined speed, the rotational coupling between the first gear shaft 12 and the hollow shaft 12b and, as a result thereof, to the second gear shaft 15. A free-wheel mechanism is labelled with the reference numeral 38. A kick or cable starter can be employed as a starting mechanism either in addition to or in lieu of the electric starter 32.

The crank space 36 is hydraulically separated from the gear space 35 so that separate lubricants, which are optimized for the specific purpose of utilization, can be utilized for lubricating.

The invention is suited for both air cooled and water-cooled internal combustion engines.

What is claimed is:

1. An internal combustion engine with at least one cylinder with a reciprocating piston coupled to a connecting rod for rotating a crankshaft, with an engageable gear that is comprised of a first gear shaft that is driven by the crankshaft through a belt-type stepless transmission and of a second gear shaft that is coupled to an intermediate shaft for rotating a drive shaft, and with a balancer shaft driven by the crankshaft, said crankshaft, first gear shaft, second gear shaft, intermediate shaft and balancer shaft being disposed in one common, multi-piece housing, wherein at least five shafts selected from the group consisting of the crankshaft, the first gear shaft, the second gear shaft, the intermediate shaft and the balancer shaft are disposed in a first parting plane of a first and a second housing piece of the housing and wherein a third housing piece is adjoined with the second housing piece, a second parting plane extending between the second and the third housing piece.

2. The internal combustion engine according to claim 1, wherein the second parting plane is extending in a parallel orientation with the first parting plane.

3. The internal combustion engine according to claim 1, wherein the rotational axis of the drive shaft is lying in the second parting plane.

4. The internal combustion engine according to claim 1, wherein front ends of the crankshaft and of the first gear shaft at least are covered with a fourth and fifth housing piece, said fourth and fifth housing piece forming with the first and second housing piece third and fourth parting planes that are oriented normal to the first parting plane.

5. The internal combustion engine according to claim 1, wherein the cylinder is disposed in the same housing as the shafts.

6. The internal combustion engine according to claim 1, wherein a differential gear is disposed in the housing in the region of the drive shaft.

7. The internal combustion engine according to claim 6, wherein a transmission shaft takes departure from the differential gear at right angles to the drive shaft, said transmission shaft being disposed parallel to the first parting plane.

8. The internal combustion engine according to claim 7, wherein said transmission shaft is disposed in the second parting plane.

9. The internal combustion engine according to claim 1, wherein a gear space is hydraulically separated from a crank space.

* * * * *